United States Patent [19]
Tatsuno et al.

[11] Patent Number: 5,615,199
[45] Date of Patent: Mar. 25, 1997

[54] OPTICAL HEAD APPARATUS

[75] Inventors: Kimio Tatsuno, Tokyo; Takeshi Shimano, Hachioji; Hiroshi Fukuda, Kodaira; Osamu Komoda, Kokubunji, all of Japan

[73] Assignee: Hitachi, Ltd., Tokyo, Japan

[21] Appl. No.: 356,524

[22] Filed: Dec. 15, 1994

[30] Foreign Application Priority Data

Dec. 20, 1993 [JP] Japan .................................. 5-319319

[51] Int. Cl.$^6$ .................................................. G11B 7/00
[52] U.S. Cl. ..................... 369/112; 369/103; 369/100; 372/32; 372/103
[58] Field of Search .................................. 369/103, 112, 369/116, 120, 121, 60, 100; 365/234, 125, 124, 127, 215; 372/32, 103

[56] References Cited

U.S. PATENT DOCUMENTS

| | | | |
|---|---|---|---|
| 5,025,438 | 6/1991 | Emoto | 369/112 |
| 5,349,592 | 9/1994 | Andó | 372/32 |
| 5,379,266 | 1/1995 | Russell | 369/103 |
| 5,434,840 | 7/1995 | Ezuka et al. | 369/100 |

*Primary Examiner*—Loha Ben
*Attorney, Agent, or Firm*—Antonelli, Terry, Stout & Kraus, LLP

[57] ABSTRACT

An optical head apparatus for recording and reproducing data to and from optical disks, the apparatus boosting recording density by use of an objective lens with a higher numerical aperture (NA) than ever. A phase plate is added to the pupil position of the objective lens or to a position close thereto. The phase plate arrangement provides a deeper focal length, reduces the adverse effects of aberration and eliminates the need for a tilt servo mechanism despite the use of the objective lens having a greater numerical aperture than before.

11 Claims, 6 Drawing Sheets

FIG. 3A1
SPOT PROFILE
CONTOUR

FIG. 3A2
SPOT PROFILE
CROSS SECTION
(COMA ABERRATION = 0)

FIG. 3B1
SPOT PROFILE
CONTOUR

FIG. 3B2
SPOT PROFILE
CROSS SECTION
(COMA ABERRATION = 0.15λ)

FIG. 3C1
SPOT PROFILE
CONTOUR

FIG. 3C2
SPOT PROFILE
CROSS SECTION
(COMA ABERRATION = 0.35λ)

FIG. 4A1
SPOT PROFILE
CONTOUR

FIG. 4A2
SPOT PROFILE
CROSS SECTION
(COMA ABERRATION = 0)

FIG. 4B1
SPOT PROFILE
CONTOUR

FIG. 4B2
SPOT PROFILE
CROSS SECTION
(COMA ABERRATION = 0.15λ)

FIG. 4C1
SPOT PROFILE
CONTOUR

FIG. 4C2
SPOT PROFILE
CROSS SECTION
(COMA ABERRATION = 0.35λ)

FIG. 5A1  SPOT PROFILE CONTOUR
FIG. 5A2  SPOT PROFILE CROSS SECTION

FIG. 5B1  SPOT PROFILE CONTOUR
FIG. 5B2  SPOT PROFILE CROSS SECTION

FIG. 5C1  SPOT PROFILE CONTOUR
FIG. 5C2  SPOT PROFILE CROSS SECTION

FIG. 6A1
Y (MICRON)
SPOT PROFILE CONTOUR

FIG. 6A2
X (MICRON)
(ASTIGMATISM = 0)
SPOT PROFILE CROSS SECTION

FIG. 6B1
Y (MICRON)
SPOT PROFILE CONTOUR

FIG. 6B2
X (MICRON)
(ASTIGMATISM = 0.15λ)
SPOT PROFILE CROSS SECTION

FIG. 6C1
Y (MICRON)
SPOT PROFILE CONTOUR

FIG. 6C2
X (MICRON)
(ASTIGMATISM = 0.35λ)
SPOT PROFILE CROSS SECTION

OPTICAL HEAD APPARATUS

BACKGROUND OF THE INVENTION

The present invention relates to an optical head apparatus and, more particularly, to the optics of an optical head apparatus for high storage density recording.

Optical disks have recording densities higher by about one order of magnitude than magnetic disks and other like memory devices. Removability is one distinct feature of optical disks that are capable of storing not only numbers and characters but also images and audio signals. As they accommodate such data in large quantities, optical disks are expected to play a major role from now on as a large-capacity storage memory addressing multimedia applications.

In the field of laser technology, improvements have been made to use laser sources of progressively shorter wavelengths: from conventional infrared rays to red rays having wavelengths on the order of 600 nm, green rays on the order of 500 nm, blue rays on the order of 400 nm, purple rays on the order of 300 nm, and ultraviolet rays. The trend toward shorter wavelengths is to make recording densities higher than ever before. One highly promising short wavelength laser source reported recently is a II–VI compound diode laser having a band gap wider than the conventional III–V compound diode laser. An alternative and similarly energetic approach to shortening the wavelength of the laser source centers on the use of wavelength conversion based on nonlinear optics.

Aside from the attempts to enhance the recording density of optical disks using laser sources of shorter wavelengths, some researchers are trying to increase the numerical aperture (NA) of objective lenses. The spot size of a light beam emitted by a laser source on an optical disk surface is given by dividing the wavelength of the beam by the numerical aperture (NA) of the objective lens in use. This is because recording density is inversely proportional to the squared reciprocal number of the spot size involved.

Larger numerical apertures (NA) of the objective lens entail some disadvantages: a pronounced coma aberration or astigmatic aberration relative to an objective lens tilt or an optical disk tilt. That bottleneck leads to a drop in the Strehl intensity of the light spot focused on the optical disk surface. With the spot size getting larger and with the resolution power reduced correspondingly, a readout signal from the optical disk may fail to reach a predetermined tolerance level. This makes it impossible to read the optical disk. In terms of wave aberration, coma aberration increases in proportion to the numerical aperture cubed, and astigmatic aberration grows in proportion to the numerical aperture squared. That is, the greater the numerical aperture of the objective lens for recording of higher densities, the higher the increase in aberration. Eventually the optical disk becomes impossible to read.

One conventional solution to the above drawback is what is known as a tilt servo mechanism, adopted in addition to the auto focusing and the tracking servo mechanism of the optical head regarding the optical disk. The tilt servo mechanism is a servo mechanism that keeps aligning the objective lens axis with the normal direction of the optical disk surface. But this mechanism has some disadvantages of its own. Because the tilt servo mechanism has a three-dimensional actuator implemented by adding a tilting actuator to the traditional two-dimensional actuator, it has a more complicated structure. That in turn means a heavier weight and higher costs. In view of today's trends toward preferring downsized information systems, this solution has failed to gain widespread popularity.

Meanwhile, as disclosed by Hiroshi Kubota et al. in "Handbook for Optics" (Asakura Shoten Co., 12th print, supplemented edition, 1990, pp. 180–181), the imaging quality of images formed on a camera film is reportedly improved by furnishing an aberration correction filter in the pupil position of an aberration-containing imaging lens such as a camera lens. Attempts have been made to apply this method to the optics of steppers for manufacturing semiconductor LSI chips, as disclosed in the Micro-Process Conference '93 digest A-4-2, pp. 40–41. However, the optics cited above was intended to improve the imaging quality of two-dimensional images, either on the film with the camera lens or on the wafer with the stepper lens. As such, the cited optics is not relevant to applications dealt with by this invention, i.e., applications involving the construction of the laser beam focusing spot for the optical head apparatus. New measures are thus needed to install the aberration correction filter in the pupil position.

SUMMARY OF THE INVENTION

It is therefore a general object of the present invention to provide a novel optical disk apparatus capable of high storage density recording on optical disks. A more specific object of the invention is to provide an optical disk apparatus for high storage density recording, the apparatus having a deeper focal length and suffering reduced effects of aberration while taking advantage of an objective lens with a higher numerical aperture (NA).

In carrying out the present invention, there is provided an optical head apparatus comprising an objective lens and an effective phase plate. The effective phase plate is located in at least one of two positions consisting of the pupil position of the objective lens and of a position close to the pupil, whereby a phase difference is produced on the light spot. This modifies the spot profile formed on the optical disk surface so as to reduce the adverse effects of aberration.

More specifically, the objects above may be achieved according to one aspect of the invention, which provides an optical head apparatus comprising a diode laser source, optics for at least focusing a light beam emitted by the diode laser source onto the surface of an optical disk, and guide means for guiding a reflected beam from the optical disk surface to an optical detector, wherein a phase plate is located in at least one of two positions consisting of the pupil of the optics and of a position close to the pupil.

In a preferred structure according to the invention, the optics comprises an objective lens of which at least one surface has the phase plate furnished thereon, the phase plate working effectively in at least one of two positions consisting of the pupil position of the objective lens and of a position close to the pupil. Illustratively, the objective lens may be a conjugate optics lens set for providing the functions of a collimator lens and an objective lens; the objective lens may also be an aspherical singlet for providing these functions. The phase plate may be furnished either directly on, or at a predetermined distance from, one or both of the two surfaces of the objective lens.

The phase plate is preferably composed of an optical element having two co-centered regions arranged so as to produce a phase difference between the central part and the marginal part of the regions. The material from which to make the phase plate may illustratively be optical glass of high transmittance such as fused silica. The phase difference between the central part and the marginal part is preferably such that the side lobe height involved is practically 80% or less of the signal peak value in the intensity profile cross-section of the light spot, though there is room for an optical detector to play in measurement. A typical phase difference of the phase plate having the two co-centered regions is such that the optical path difference involved is about half of the light beam waveform. The center part should have a radius 10% to 80%, most preferably 40%, of the radius of the outermost periphery of the marginal part. The radius ratio needs to be maintained to ensure a sufficiently high signal intensity for reliable signal detection.

The phase plate offering such characteristics of the phase difference region is structured so that the phase of the central part lags behind that of the marginal part. Specifically, the central part is made convex or thicker than the marginal part to ensure the delayed phase of the central part relative to the phase of the marginal part. Alternatively, the central part of the phase plate is made concave or thinner than its marginal part so as to provide an advanced phase of the central part with respect to the phase of the marginal part.

In the inventive optical head apparatus, the phase plate is furnished in at least one of two positions consisting of the pupil position of the objective lens and of a position close to the pupil. Located where it is, the phase plate works to add a phase difference to the wave surface of the light beam passing therethrough. This arrangement provides a deeper focal length, reduces the adverse effects of coma and astigmatic aberration, and renders the numerical aperture (NA) of the objective lens appreciably larger than is conventionally tolerated. As a result, the density of recording on optical disks is significantly enhanced.

These and other objects, features and advantages of the invention will become more apparent upon a reading of the following description and appended drawings.

DESCRIPTION OF THE PREFERRED EMBODIMENTS

Preferred embodiments of the invention will now be described with reference to the accompanying drawings.

(First Embodiment)

Figure 1:
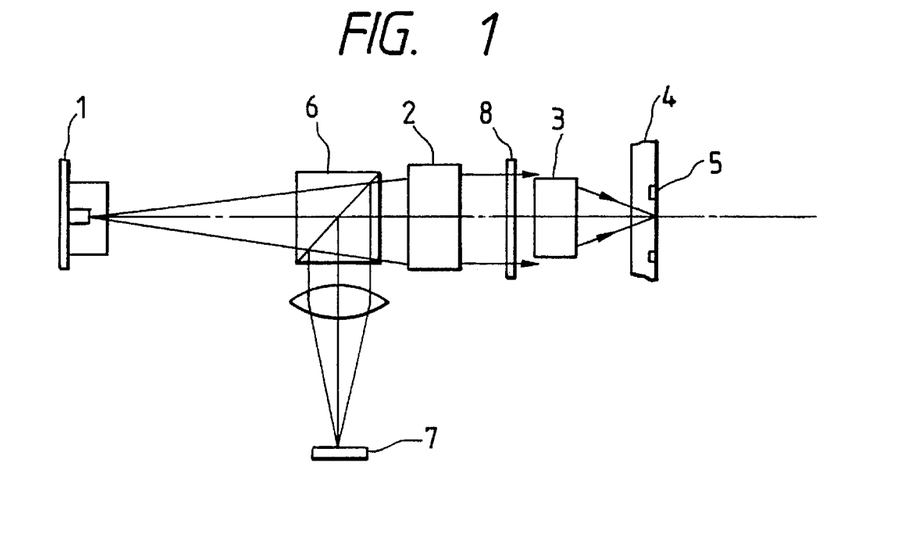
FIG. 1 is a block diagram of the optics in an optical head apparatus practiced as a preferred embodiment of the invention.

FIG. 1 is a block diagram of the optics in an optical head apparatus practiced as the first embodiment of the invention. In FIG. 1, a light beam from a semiconductor laser device (laser source) 1 is collimated by a collimator lens 2 to reach an objective lens 3 as a parallel beam. The objective lens 3, with its focusing function, forms a small light spot on the surface of an optical disk 4. On the objective lens side of the optical disk 4 is a layer of cover glass, not shown, having a constant thickness. Beneath the cover glass are micron-order depressions, density shadings or magneto-optical domains called pits 5 representing recorded information (i.e., signals). Where pits 5 are not furnished on the optical disk 4, the incident light is mirror-reflected by the disk surface. The reflected light returns to an optical detector 7 via a beam splitter 6.

If the pits 5 are constituted by patterns of depressions, the light beam from the laser source 1 passes through the objective lens 3 to irradiate the optical disk 4. When a light spot formed by the irradiated light on the disk surface hits a pit 5, the light is diffracted thereby. The diffraction reduces the quantity of the light returning to the aperture of the objective lens 3, whereby the quantity of the light reaching the optical detector 7 (i.e., incident light) is lowered. Detecting changes in the quantity of the return light provides reading of the information (signals) from the optical disk.

If the pits 5 are constituted by density shadings, differences in reflectance represent modulation quantities; if the pits 5 are made of magneto-optical domains, those polarized changes in the reflected light which are dependent on the magnetized direction (i.e., changes in Kerr effect) represent signal quantities.

In the above-described optics of the first embodiment, a phase plate 8 is located close to the pupil position of the objective lens 3.

Figure 2A:
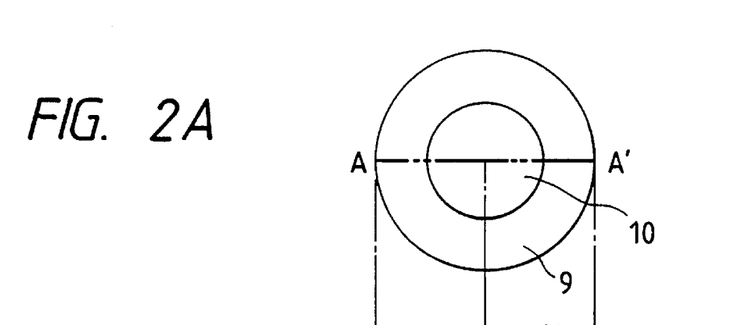
FIG. 2A is a plan view of a typical phase plate used in the embodiment.
Figure 2B:
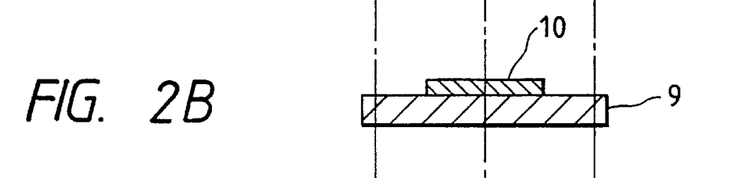
FIG. 2B is a cross-sectional view taken on line A–A' of the phase plate in FIG. 2A.
Figure 2C:
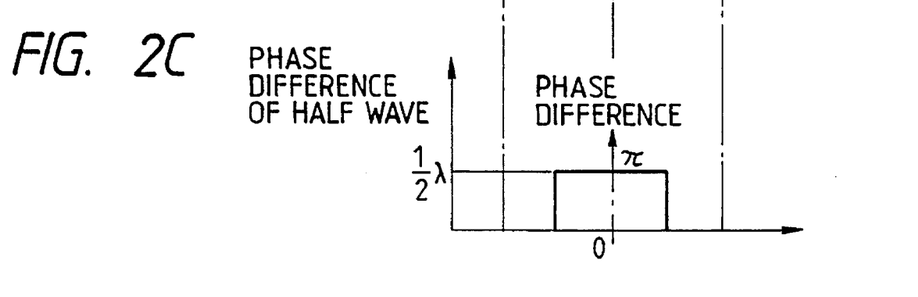
FIG. 2C is a phase difference profile chart of the phase plate shown in FIGS. 2A and 2B.

FIG. 2A is a plan view of a typical phase plate 8 used in the first embodiment, FIG. 2B is a cross-sectional view taken on line A–A' in FIG. 2A, and FIG. 2C is a phase difference profile chart of the phase plate 8. As illustrated, the phase plate 8 comprises two co-centered circles forming a central part 10 and a marginal part 9. The phase difference between the central part 10 and the marginal part 9 is about half of the wavelength of the light beam in use. Illustratively, a single or multiple layers of fused silica $SiO_2$ are made into a convex area on a fused silica glass plate 9 having a substantially uniform refraction index, the convex area serving as the central part 10. The convex central part 10 and the flat marginal part 9 are structured so that the optical path difference therebetween is about half of the laser wavelength.

On the phase plate 8, the central part 10 has a radius ratio of 40% with respect to the outer periphery of the marginal part 9. In practice, this radius ratio may be varied within a range of ±40%. The way of forming the central part 10 on the fused silica glass plate 9 is easier than the known pattern fabrication method such as sputtering or chemical vapor deposition (CVD) for thin film formation. The material for the central and marginal parts is not limited to fused silica $SiO_2$ alone; any other known optical glass may be used instead as long as it has a sufficient level of transmittance.

A setup where the objective lens 3 and the collimator lens 2 are integrally formed is called a conjugate optics. In such conjugate optics, the phase plate 8 is located inside the lens because the pupil position is located inside the lens. Illustratively, the phase plate 8 is furnished in the middle of a lens set composed of the objective lens 3 and the collimator lens 2.

FIGS. 3A through 6C are spot profile charts showing calculated spot profiles of the light spot focused on the optical disk 4 by the optics of FIG. 1 in a variety of cases. In each spot profile chart, the upper part is a view of spot profile contours in X-Y two-dimensional coordinates representing spot intensities; the lower part is a spot profile cross-sectional view taken approximately at the center of the contours, the axis of ordinate representing spot profiles, the axis of abscissa representing X coordinates.

Figure 3A:
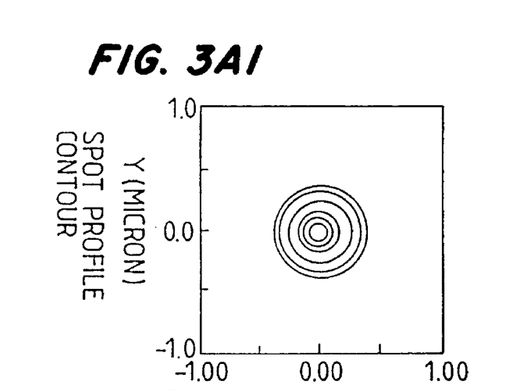
FIG. 3A is a spot profile chart in effect when coma aberration=0 with an optical head apparatus implemented as a first comparative example having no phase plate, the upper part being a spot profile contour view, the lower part being a spot profile cross-sectional view.
FIG. 3B is a spot profile chart in effect when coma aberration=0.15 λ with the first comparative example.
FIG. 3C is a spot profile chart in effect when coma aberration=0.35 λ with the first comparative example.
Figure 3A:
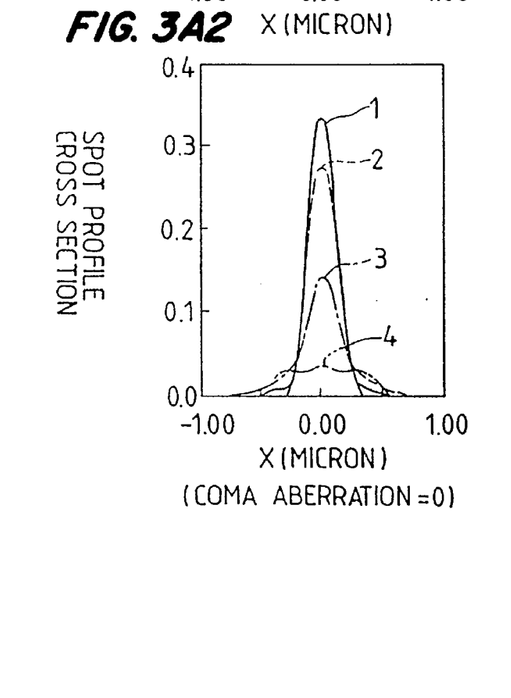
Figure 3B:
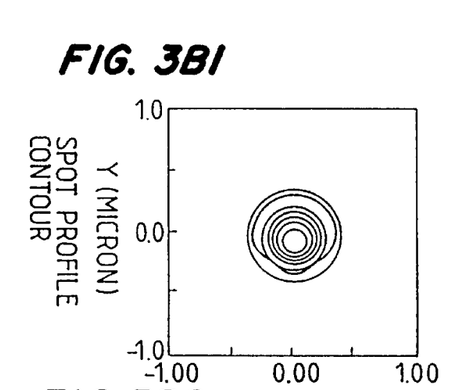
Figure 3B:
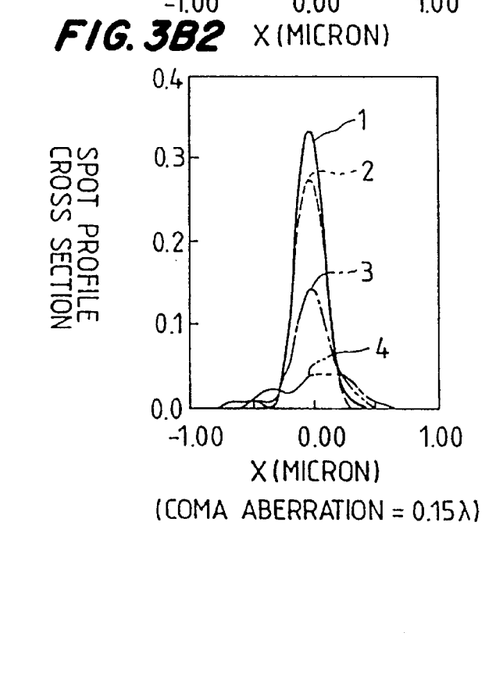
Figure 3C:
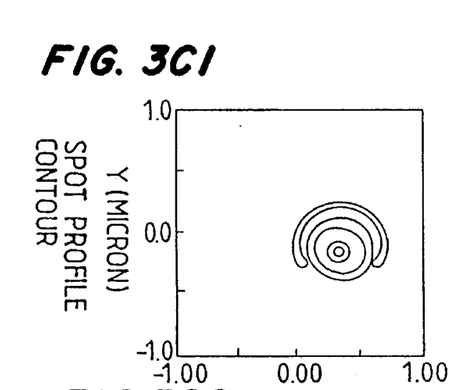
Figure 3C:
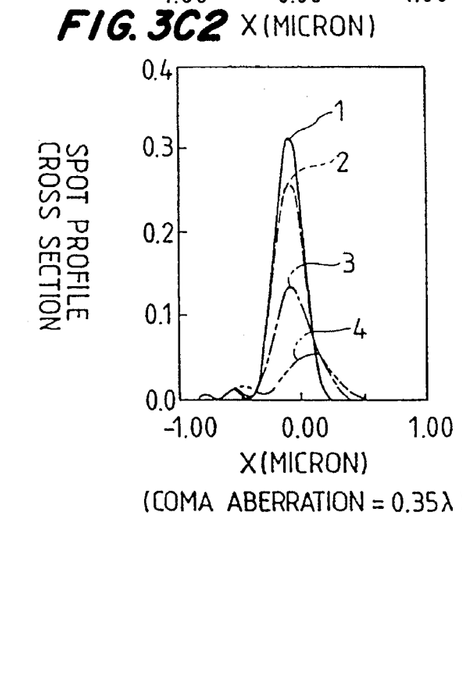

FIG. 3A is a spot profile chart in effect when coma aberration is zero with an optical head apparatus implemented as a first comparative example having no phase plate. FIG. 3B is a spot profile chart in effect when coma aberration=0.15 λ with the first comparative example, and FIG. 3C is a spot profile chart in effect when coma aberration=0.35 λ with the first comparative example. The symbol 2 denotes the wavelength of the semiconductor laser in use. In these views, a solid line 1 stands for profile changes with no defocusing applied, a broken line 2 denotes profile changes with defocusing of ±0.5 microns applied, a dashed line 3 represents profile changes with defocusing of ±1.0 microns applied, and a two-dot chain line 4 indicates profile changes with defocusing of ±1.5 microns applied.

Figure 4A:
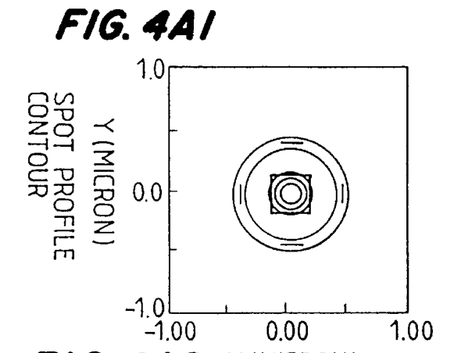
FIG. 4A is a spot profile chart in effect when coma aberration=0 with the first embodiment, the upper part being a spot profile contour view, the lower part being a spot profile cross-sectional view.
FIG. 4B is a spot profile chart in effect when coma aberration=0.15 λ with the first embodiment.
FIG. 4C is a spot profile chart in effect when coma aberration=0.35 λ with the first embodiment.
Figure 4A:
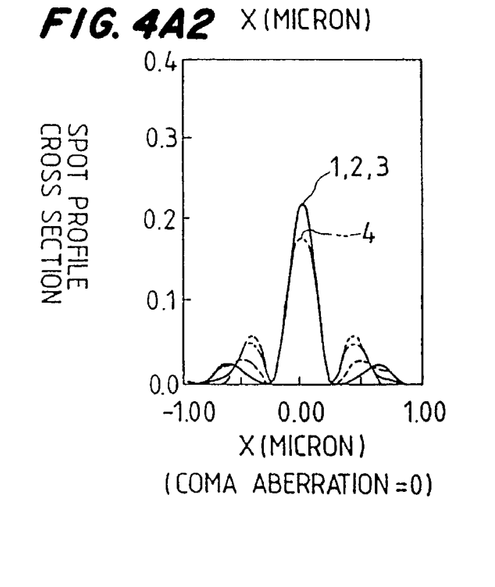
Figure 4B:
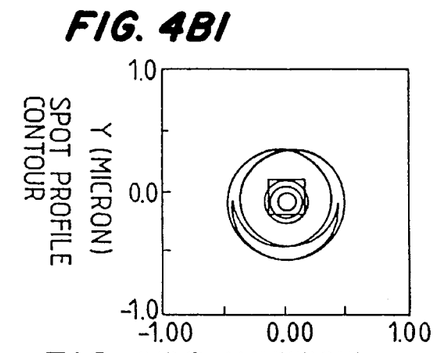
Figure 4B:
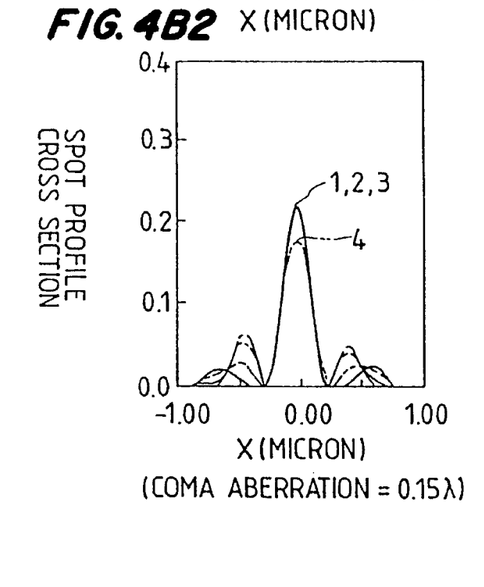
Figure 4C:
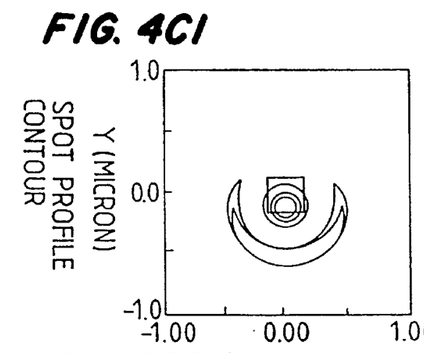
Figure 4C:
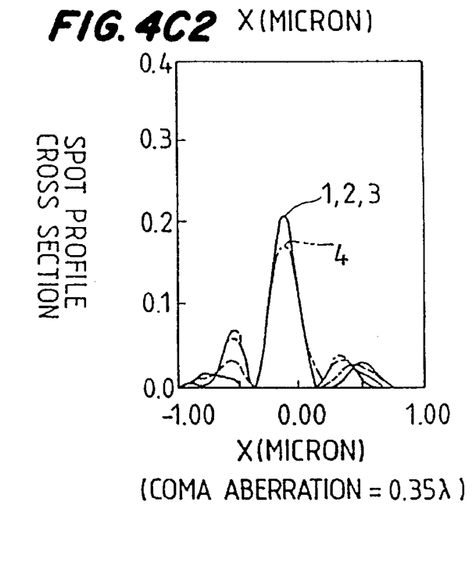

FIG. 4A is a spot profile chart of the first embodiment comprising the phase plate 8 and operating under the same measuring condition as that of the first comparative example in FIG. 3A, i.e., when coma aberration is zero. FIG. 4B is a spot profile chart in effect when coma aberration=0.15 λ with the first embodiment, and FIG. 4C is a spot profile chart in effect when coma aberration=0.35 λ with the first embodiment. In these views, as above, a solid line 1 stands for profile changes with no defocusing applied, a broken line 2 denotes profile changes with defocusing of ±0.5 microns applied, a dashed line 3 represents profile changes with defocusing of ±1.0 microns applied, and a two-dot chain line 4 indicates profile changes with defocusing of ±1.5 microns applied.

Figure 5A:
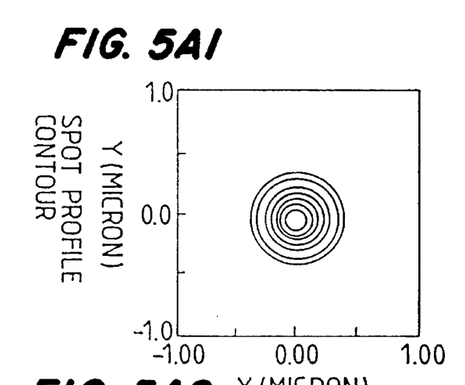
FIG. 5A is a spot profile chart in effect when astigmatic aberration=0 with an optical head apparatus implemented as a second comparative example having no phase plate, the upper part being a spot profile contour view, the lower part being a spot profile cross-sectional view.
FIG. 5B is a spot profile chart in effect when astigmatic aberration=0.15 λ with the second comparative example.
FIG. 5C is a spot profile chart in effect when astigmatic aberration=0.35 λ with the second comparative example.
Figure 5A:
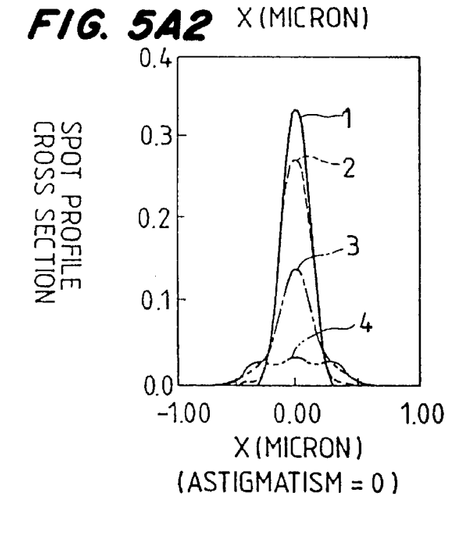
Figure 5B:
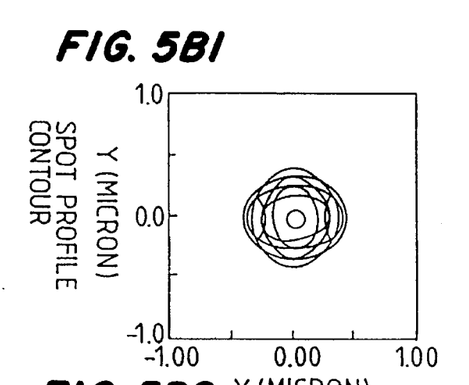
Figure 5B:
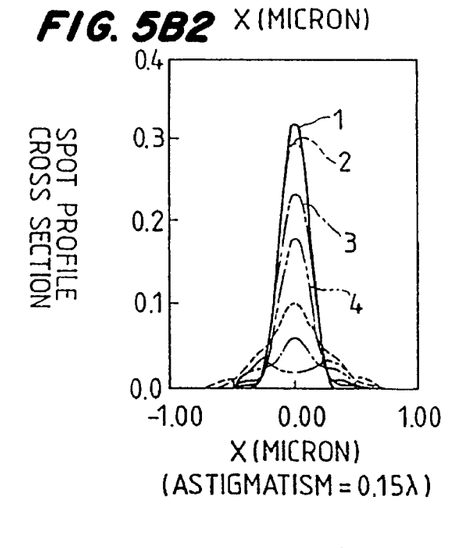
Figure 5C:
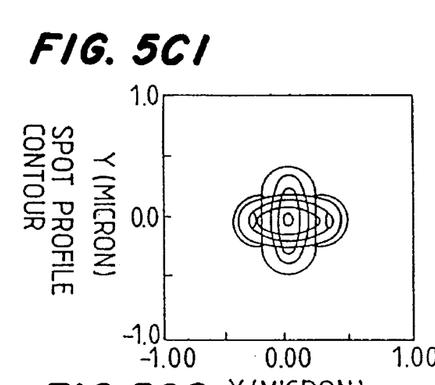
Figure 5C:
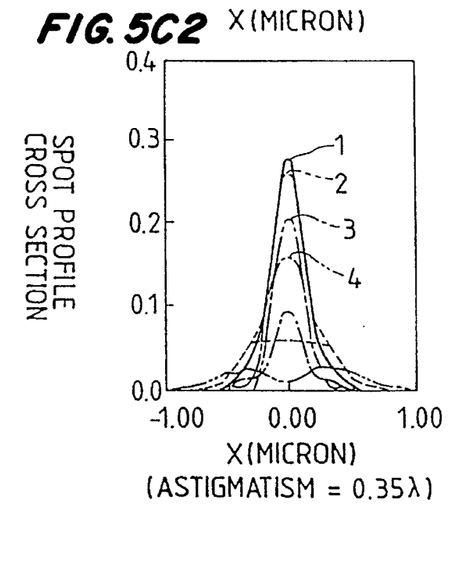

FIGS. 5A through 5C are spot profile charts of the second comparative example having no phase plate 8 and operating under the same measuring conditions as those of FIGS. 3A through 3C, respectively, with astigmatism and defocusing taken into consideration.

Figure 6A:
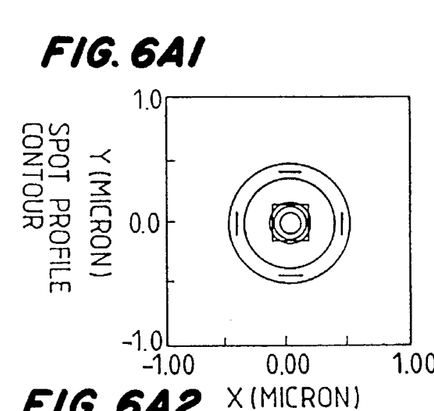
FIG. 6A is a spot profile chart in effect when astigmatic aberration=0 with the first embodiment, the upper part being a spot profile contour view, the lower part being a spot profile cross-sectional view.
FIG. 6B is a spot profile chart in effect when astigmatic aberration=0.15 λ with the first embodiment.
FIG. 6C is a spot profile chart in effect when astigmatic aberration=0.35 λ with the first embodiment.
Figure 6A:
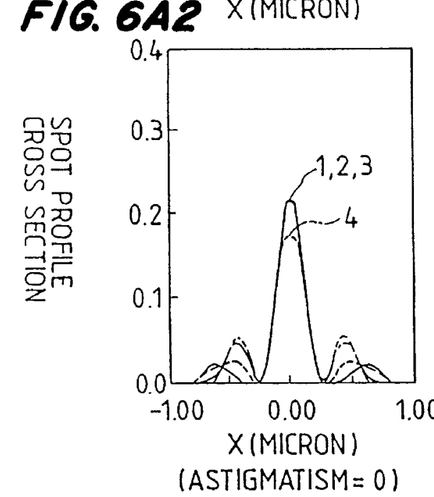
Figure 6B:
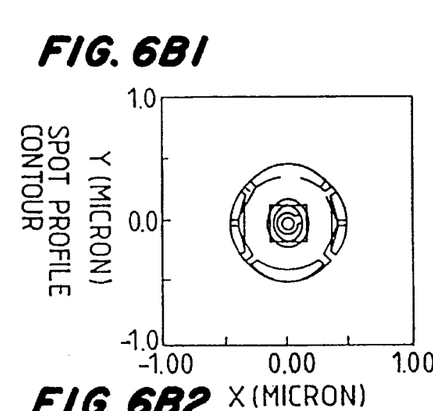
Figure 6B:
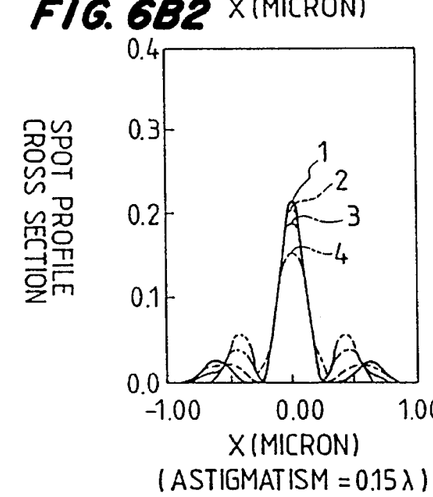
Figure 6C:
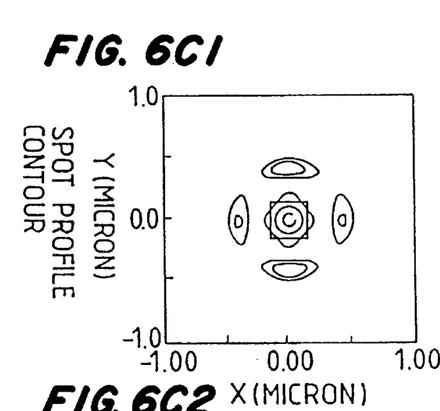
Figure 6C:
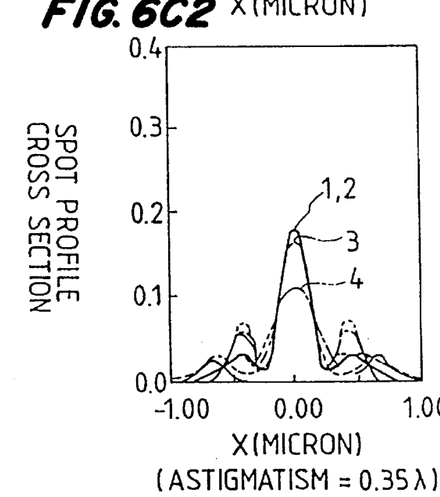

FIGS. 6A through 6C are spot profile charts of the first embodiment comprising the phase plate 8 and operating under the same measuring conditions as those of FIGS. 5A through 5C for the second comparative example.

Comparing the above profile charts reveals that the first embodiment comprising the phase plate 8 suffers significantly reduced changes in spot profile against aberration and defocusing, as shown in FIGS. 4A through 4C and 6A through 6C. Specifically, as is clear from the comparison of FIGS. 3A through 3C respectively with FIGS. 4A through 4C and from the comparison of FIGS. 5A through 5C respectively with FIGS. 6A through 6C in terms of spot profile cross-section (i.e., lower-part views), the first embodiment is highly immune to the adverse effects of aberration and has an appreciably lowered level of main peak value dispersion at times of defocusing. However, the first embodiment tends to have lower main peak values and a greater side lobe height than the comparative example. Still, the raised side lobe does not prevent an appropriately selected optical detector from detecting optical signals reliably with no drop in detection performance. Preferably the side lobe is 50% or less of the main peak value. Even where the side lobe is in excess of the 50% benchmark with respect to the main peak value, the appreciably reduced adverse effects of aberration still render the embodiment feasible through the proper choice of the optical detector.

The height and the pattern of the side lobe with respect to the main peak value are determined by appropriately selecting two factors: the phase difference between the central part 10 and the marginal part 9 of the phase plate 8, and the radius ratio of the two co-centered circles making up the phase plate 8.

The first embodiment of the above-described constitution provides a deeper focal length and reduces the adverse effects of aberration. That is, the embodiment may be a small, high-performance optical head apparatus utilizing an objective lens of a higher numerical aperture (NA) than ever without recourse to a tilt servo mechanism.

(Second Embodiment)

The second embodiment is in fact a variation of the first embodiment having replaced its phase plate 8 with a modified one. The first embodiment has its phase plate 8 made of two co-centered regions comprising a convex central part 10 for producing the phase difference. By contrast, the second embodiment has a concave central part 10, i.e., the marginal part 9 being made thicker than the central part 10.

Figure 7A:
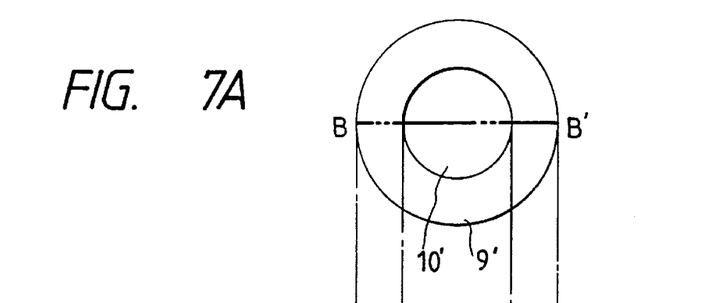
FIG. 7A is a plan view of a typical phase plate used in an optical head apparatus practiced as another preferred embodiment.
Figure 7B:
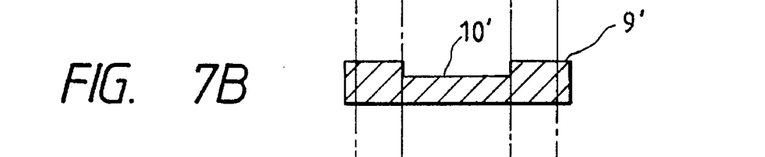
FIG. 7B is a cross-sectional view taken on line B–B' of the phase plate in FIG. 7A.
Figure 7C:
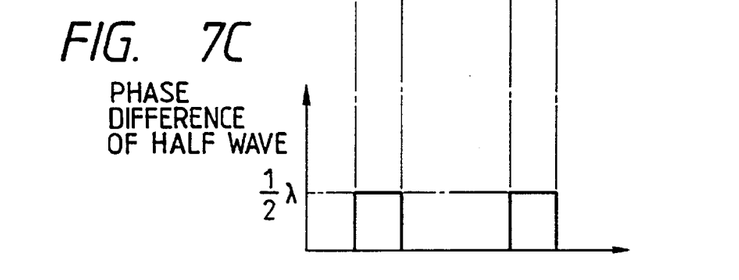
FIG. 7C is a phase difference profile chart of the phase plate shown in FIGS. 7A and 7B.

FIG. 7A is a plan view of the phase plate 8 having a concave central part and used in the second embodiment, FIG. 7B is a cross-sectional view taken on line B–B' in FIG. 7A, and FIG. 7C is a phase difference profile chart of the phase plate 8 shown in FIGS. 7A and 7B. As illustrated, the phase plate 8 has two co-centered circles arranged so that the phase difference between the central part 10' and the marginal part 9' of the plate is approximately half of the laser wavelength. Illustratively, the central part 10' of a fused silica glass plate 9' having a substantially uniform refraction index is etched to a predetermined depth in order to form a concave pattern therein. The concave pattern is readily formed by means of known lithography techniques using an appropriate mask, such as dry etching based on sputtering (including reaction sputter etching using etching gas) or wet etching using a hydrofluoric acid solution.

Instead of having the fused silica glass plate 9' etched, a single or multiple layers of fused silica $SiO_2$ may alternatively be made into a convex marginal region surrounding the central part on the fused silica glass plate 9, in the same manner as with the first embodiment. The resulting structure is the same as that formed by lithography. In experiments conducted by the inventor, the phase plate 8 of FIGS. 7A through 7C was mounted close to the pupil position of the objective lens in the optics of the second embodiment in the same manner as with the first embodiment. The obtained characteristics were substantially the same as those illustrated in FIGS. 4A through 4C and in FIGS. 6A through 6C.

(Third Embodiment)

The third embodiment, not shown, is implemented by locating the phase plate 8 (the same as that of the first embodiment in FIGS. 2A through 2C or of the second embodiment in FIGS. 7A through 7C) behind the objective lens 3, i.e., on the optical disk side of the lens as opposed to the setup of the optics in FIG. 1. When tested, the third embodiment also turned out to be capable of reducing the adverse effects of aberration as effectively as the first or the second embodiment.

(Fourth Embodiment)

The fourth embodiment, not shown, is implemented by locating the phase plate 8 (the same as that of the first embodiment in FIGS. 2A through 2C or of the second embodiment in FIGS. 7A through 7C) both in front of and behind the objective lens 3 in the optics of FIG. 1. Structured in this manner, the fourth embodiment when tested also turned out to be capable of reducing the adverse effects of aberration as effectively as the first or the second embodiment.

(Fifth Embodiment)

Figure 8A:
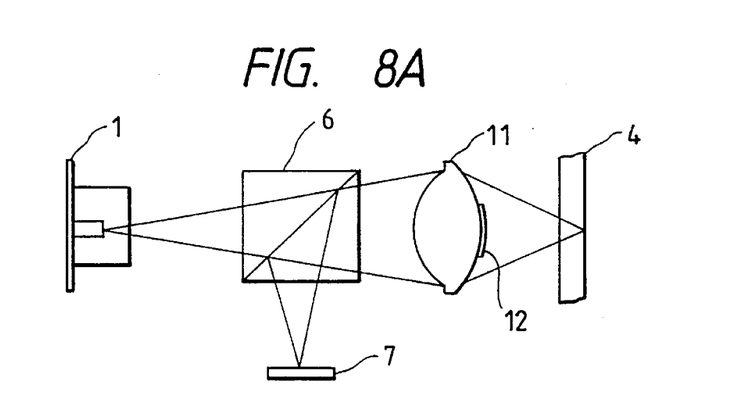
FIG. 8A is a block diagram of the optics in an optical head apparatus practiced as a further preferred embodiment of the invention, the optics utilizing a singlet for its objective lens.
Figure 8B:
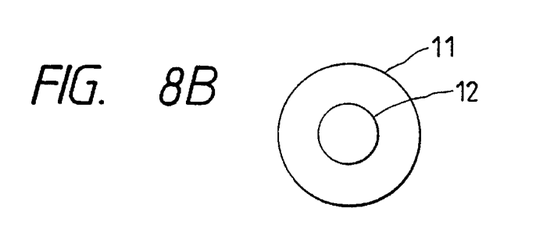
FIG. 8B is a plan view of a typical phase plate used in the embodiment of FIG. 8A.

FIG. 8A is a block diagram of the optics in an optical head apparatus practiced as the fifth embodiment of the invention, and FIG. 8B is a plan view of a typical phase plate used in the fifth embodiment. The optics of FIG. 8A utilizes a singlet for its objective lens. Such a conjugate optical head may have its lens constructed as a singlet lens 11 comprising an aspheric surface. In that case, a phase plate 12 is mounted on one or both of the two lens surfaces. The phase plate 12 has its film thickness or its film thickness profile determined so that when the wave surface reaches the pupil position, the wave surface phase difference between the central part and the marginal part is about half of the laser wavelength. Where the phase plate 12 is mounted on the optical disk side of the lens 11 as illustrated, the phase plate 12 is shaped so that the wave surface phase difference in the pupil position between the central part and the marginal part is about half of the laser wavelength.

The phase plate 12 is readily mounted on the lens surface by means of known pattern forming methods. Illustratively, fused silica $SiO_2$ may be deposited on the lens surface by sputtering to form the appropriate pattern. If the phase plate 12 is formed directly on the lens surface as in the case above, the phase plate 12 has the same curvature as the lens and thus reduces the optical loss incurred. Needless to say, the phase plate 8 of the first embodiment in FIGS. 2A through 2C may also be mounted close to the lens 11. Where a singlet objective lens is formed by metallic molding, the mold may be appropriately formed in advance so that the phase plate is molded at the same time as the lens.

As described, the optical head apparatus according to the invention achieves the stated objects thereof when suitably implemented. Specifically, when used with read-only compact disks, laser disks or CD-ROM's or with rewritable magneto-optical disks or phase change optical disks, the inventive optical head apparatus permits the use of an objective lens with a numerical aperture (NA) of about 0.45 to 0.55 or even higher. This feature allows the optical head apparatus to contribute significantly to enhancing the recording density of optical disks employed. With its ability to deepen the focal length and to reduce the adverse effects of aberration, the optical head apparatus eliminates the need for a tilt servo mechanism where an objective lens of an enhanced numerical aperture is used. This also allows the inventive optical head apparatus to be small and lightweight when it is manufactured.

As many apparently different embodiments of this invention may be made without departing from the spirit and scope thereof, it is to be understood that the invention is not limited to the specific embodiments thereof except as defined in the appended claims.

What is claimed is:

1. An optical head apparatus comprising a diode laser source, optics for at least focusing a light beam emitted by said diode laser source onto the surface of an optical disk, and guide means for guiding a reflected beam from the optical disk surface to an optical detector, wherein a phase plate is located in at least one of two positions consisting of the pupil of said optics and of a position close to said pupil, and wherein said optics comprises an objective lens of which at least one surface has said phase plate furnished thereon, said phase plate working effectively in the pupil position of said objective lens.

2. An optical head apparatus according to claim 1, wherein said optics comprises a conjugate optics lens set for providing the functions of a collimator lens and an objective lens, and wherein said phase plate is located in at least one of two positions consisting of the pupil of said lens set and of a position close to said pupil.

3. An optical head apparatus according to claim 1, wherein said optics include conjugate optics comprising an aspherical singlet for providing the functions of a collimator lens and an objective lens, and wherein said phase plate is located in at least one of two positions consisting of the pupil of said aspherical singlet and of a position close to said pupil.

4. An optical head apparatus according to claim 1, wherein said phase plate is composed of an optical element having two co-centered regions arranged so as to produce a phase difference between the central part and the marginal part of the regions.

5. An optical head apparatus according to claim 1, wherein said phase plate is composed of an optical element having two co-centered regions arranged so that the optical path difference between the central part and the marginal part of the regions is half of the wavelength of said light beam.

6. An optical head apparatus comprising a diode laser source, optics for at least focusing a light beam emitted by said diode laser source onto the surface of an optical disk, and guide means for guiding a reflected beam from the optical disk surface to an optical detector, wherein a phase plate is located in at least one of two positions consisting of the pupil of said optics and of a position close to said pupil, and wherein said optics includes conjugate optics comprising an aspherical singlet for providing the functions of a collimator lens and an objective lens, and wherein said phase plate is located in at least one of two positions consisting of the pupil of said aspherical singlet and of a position close to said pupil.

7. An optical head apparatus according to claim 6, wherein said phase plate is composed of an optical element having two co-centered regions arranged so as to produce a phase difference between the central part and the marginal part of the regions.

8. An optical head apparatus according to claim 6, wherein said phase plate is composed of an optical element having two co-centered regions arranged so that the optical path difference between the central part and the marginal part of the regions is half of the wavelength of said light beam.

9. An optical head apparatus comprising a diode laser source, optics for at least focusing a light beam emitted by said diode laser source onto the surface of an optical disk, and guide means for guiding a reflected beam from the optical disk surface to an optical detector, wherein a phase plate is located in at least one of two positions consisting of the pupil of said optics and of a position close to said pupil, and wherein said phase plate is composed of an optical element having two co-centered regions arranged so that the optical path difference between the central part and the marginal part of the regions is half of the wavelength of said light beam.

10. An optical head apparatus according to claim 9, wherein said phase plate is arranged so that the phase of said central part lags behind that of said marginal part.

11. An optical head apparatus comprising a diode laser source, optics for at least focusing a light beam emitted by said diode laser source onto the surface of an optical disk, and guide means for guiding a reflected beam from the optical disk surface to an optical detector, wherein a phase plate is located in at least one of two positions consisting of the pupil of said optics and of a position close to said pupil, wherein said optics comprises a conjugate optics lens set for providing the functions of a collimator lens and an objective lens, wherein said phase plate is located in at least one of two positions consisting of the pupil of said lens set and of a position close to said pupil, and wherein said phase plate is composed of an optical element having two co-centered regions arranged so that the optical path difference between the central part and the marginal part of the regions is half of the wavelength of said light beam.

* * * * *